(12) United States Patent
Takayama et al.

(10) Patent No.: US 12,264,215 B2
(45) Date of Patent: Apr. 1, 2025

(54) VINYL ALCOHOL-BASED BLOCK COPOLYMER AND METHOD FOR PRODUCING SAME

(71) Applicant: KURARAY CO., LTD., Kurashiki (JP)

(72) Inventors: Takumi Takayama, Kurashiki (JP); Kazutoshi Mishima, Kurashiki (JP); Hiroyuki Konishi, Kurashiki (JP); Kazuhiko Maekawa, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 585 days.

(21) Appl. No.: 17/623,105

(22) PCT Filed: Jun. 25, 2020

(86) PCT No.: PCT/JP2020/024961
§ 371 (c)(1),
(2) Date: Dec. 27, 2021

(87) PCT Pub. No.: WO2020/262517
PCT Pub. Date: Dec. 30, 2020

(65) Prior Publication Data
US 2022/0267499 A1   Aug. 25, 2022

(30) Foreign Application Priority Data
Jun. 28, 2019   (JP) .................................. 2019-122215

(51) Int. Cl.
| | |
|---|---|
| *C08F 293/00* | (2006.01) |
| *C08F 4/40* | (2006.01) |
| *C08F 4/70* | (2006.01) |
| *C08F 8/12* | (2006.01) |
| *C08F 220/14* | (2006.01) |
| *C08F 297/02* | (2006.01) |
| *C08F 297/06* | (2006.01) |
| *C08L 53/00* | (2006.01) |

(52) U.S. Cl.
CPC .............. *C08F 293/00* (2013.01); *C08F 4/40* (2013.01); *C08F 4/7095* (2013.01); *C08F 8/12* (2013.01); *C08F 220/14* (2013.01); *C08F 297/026* (2013.01); *C08F 297/06* (2013.01); *C08L 53/005* (2013.01)

(58) Field of Classification Search
CPC ........ C08F 8/12; C08F 293/00; C08F 216/02; C08F 216/06; C08F 218/04; C08F 218/08; C08F 220/04; C08F 220/06; C08F 220/14; C08F 220/18; C08F 220/1802; C08F 220/1803; C08F 220/1804; C08F 297/026; C08F 297/06; C08F 218/06
See application file for complete search history.

(56) References Cited

U.S. PATENT DOCUMENTS

2006/0089423 A1 *  4/2006  Ueno ..................... C08L 53/00
                                                              523/160

FOREIGN PATENT DOCUMENTS

| CN | 107814889 | * | 3/2018 | |
|---|---|---|---|---|
| EP | 3736886 A1 | * | 11/2020 | ............... C08F 2/22 |
| JP | 64-75505 A | | 3/1989 | |
| JP | 9-278827 A | | 10/1997 | |
| JP | 2004-323800 A | | 11/2004 | |
| JP | 2005-23297 A | | 1/2005 | |
| JP | 2009-138154 A | | 6/2009 | |
| JP | 2010-209336 A | | 9/2010 | |
| WO | WO 2021/251324 | * | 12/2021 | |

OTHER PUBLICATIONS

Machine translation of CN 107814889 (no date).*
International Search Report issued Sep. 15, 2020 in PCT/JP2020/024961 filed Jun. 25, 2020, 3 pages.
Wang, F.S., et al., "Highly Stretchable Free-Standing Poly(acrylic acid)-block-poly(vinyl alcohol) Films Obtained from Cobalt-Mediated Radical Polymerization", Macromolecules, vol. 50, 2017, pp. 6054-6063.

(Continued)

*Primary Examiner* — Marc S Zimmer
(74) *Attorney, Agent, or Firm* — Oblon, McClelland, Maier & Neustadt, L.L.P.

(57) ABSTRACT

Disclosed is a vinyl alcohol-based block copolymer that is a block copolymer composed of a vinyl alcohol-based polymer block (B-b) and a copolymer block (B-c) comprising a vinyl alcohol-based monomer unit and an acrylic acid-based monomer unit, wherein a content (Z) of the acrylic acid-based monomer unit relative to all monomer units is 0.05 to 20.0 mol %, the block copolymer has a saponification degree of 80 to 99.99 mol %, the block copolymer has a number-average molecular weight ($Mn_a$) of 20,000 to 440,000, the block copolymer has a molecular weight distribution ($Mw_a/Mn_a$) of 1.05 to 1.95, and a ratio ($DP_b/DP_a$) of a number-average polymerization degree ($DP_b$) of the vinyl alcohol-based polymer block (B-b) to the number-average polymerization degree ($DP_a$) of the block copolymer is 0.010 to 0.999. The copolymer has a fine balance derived from the copolymer block (B-c) of having a superior solubility in water while being unlikely to undergo thickening or gelation due to pH fluctuation, and also has high mechanic strength derived from the vinyl alcohol-based polymer block (B-b).

20 Claims, No Drawings

(56) References Cited

OTHER PUBLICATIONS

Koumura, K., et al., "$Mn_2(CO)_{10}$-Induced Controlled/Living Radical Copolymerization of Vinyl Acetate and Methyl Acrylate: Spontaneous Formation of Block Copolymers Consisting of Gradient and Homopolymer Segments", Journal of Polymer Science, vol. 47, 2009, pp. 1343-1353.

Extended European Search Report issued on Jun. 26, 2023 in European Application 20831460.9, 7 pages.

\* cited by examiner

VINYL ALCOHOL-BASED BLOCK COPOLYMER AND METHOD FOR PRODUCING SAME

TECHNICAL FIELD

The present invention relates to a vinyl alcohol-based block copolymer superior in handleability in an aqueous solution state and capable of forming a film superior in mechanical strength, and a method for producing the same.

BACKGROUND ART

Polyvinyl alcohol (hereinafter, sometimes abbreviated as PVA) resins are crystalline water-soluble polymer materials and are widely applied to emulsifiers, suspensions, surfactants, fiber treating agents, various binders, paper treating agents, adhesives, films, etc. using their superior water solubility and film properties (strength, grease resistance, film formability, oxygen gas barrier properties, etc.). Conventionally, PVAs differing in saponification degree or polymerization degree have been used according to applications. Various modified PVAs with special functions by introducing a functional group into PVAs are proposed.

Incidentally, since PVA is a crystalline polymer, if it has an excessively high saponification degree, its solubility in water is low. In order to ensure solubility in water, there are known a method of lowering the saponification degree and a method of decreasing crystallinity by randomly copolymerizing a vinyl ester with another monomer. It, however, is known that a film obtained by forming a PVA prepared by such a method into a film shape and then drying it has insufficient performance such as mechanical strength, barrier property, and water resistance because of its low crystallinity.

As a measure for preventing such deterioration of the performance of a film, a method for improving water resistance by introducing an acrylic acid-based unit into a PVA by random copolymerization to form ionic crosslinking has been proposed (Patent Document 1). However, the PVA obtained by this method is low in crystallinity, so that a resulting film is still insufficient in water resistance or film strength.

As a method for achieving both solubility in water and film properties of PVA, a method using a block copolymer of a PVA block and a hydrophilic block is conceivable.

Patent Document 2 proposes a block copolymer in which a PVA block and a block formed by copolymerizing a hydrophilic monomer and a hydrophobic monomer are linked by a hydrophobic linker. However, since the block polymer has a hydrophobic part, there is a concern about an effect of improving solubility in water. In addition, in the invention described in Patent Document 2, the end of the polyvinyl ester is halogenated by a chain transfer reaction to form the starting point of block copolymerization, but the chain transfer reaction has a drawback that an increased molecular weight and an increased halogenation efficiency cannot be achieved simultaneously. Specifically, attempting to increase the halogenation efficiency promotes chain transfer to interfere the molecular weight of a PVA block from becoming large, so that sufficient film properties cannot be obtained.

Non-Patent Document 1 describes a complete block copolymer of a PVA block and a polyacrylic acid block. However, since the polyacrylic acid block has excessively high pH sensitivity, for example, there is a concern that the block copolymer is gelled in an aqueous alkali solution and cannot be handled as a solution or the block copolymer has poor solution stability, so that the method of its use is greatly limited.

Non-Patent Document 2 describes a block copolymer of a vinyl alcohol-acrylic acid ester copolymer block and a PVA block obtained by saponifying a block copolymer of a vinyl acetate-acrylic acid ester copolymer block and a polyvinyl acetate block in a dehydrated solvent. There is a concern with the block copolymer described in Non-Patent Document 2 that since the proportion of the vinyl alcohol-acrylic acid ester copolymer block to the PVA block is large, PVA-derived film properties cannot be expected.

PRIOR ART DOCUMENTS

Patent Documents

Patent Document 1: JP 09-278827 A
Patent Document 2: JP 2010-209336 A

Non-Patent Documents

Non-Patent Document 1: Highly Stretchable Free-Standing Poly(acrylic acid)-block-poly(vinyl alcohol) Films Obtained from Cobalt-Mediated Radical Polymerization, Macromolecules, 2017, vol. 50, p. 6054-6063

Non-Patent Document 2: Mn2(CO)10-Induced Controlled/Living Radical Copolymerization of Vinyl Acetate and Methyl Acrylate: Spontaneous Formation of Block Copolymers Consisting of Gradient and Homopolymer Segments, Journal of Polymer Science: Part A: Polymer Chemistry, 2009, vol. 47, p 1343-1353

SUMMARY OF THE INVENTION

Problems to be Solved by the Invention

The present invention has been devised in order to solve the above problems, and an object thereof is to provide a vinyl alcohol-based block copolymer superior in solubility in water, aqueous solution stability, and strength and a method for producing the same.

Means for Solving the Problems

The problem described above is solved by providing a vinyl alcohol-based block copolymer that is a block copolymer composed of a vinyl alcohol-based polymer block (B-b) and a copolymer block (B-c) comprising a vinyl alcohol-based monomer unit and an acrylic acid-based monomer unit, wherein a content (Z) of the acrylic acid-based monomer unit relative to all monomer units is 0.05 to 20.0 mol %, the block copolymer has a saponification degree of 80 to 99.99 mol %, the block copolymer has a number-average molecular weight ($Mn_a$) of 20,000 to 440,000, the block copolymer has a molecular weight distribution ($Mw_a/Mn_a$) of 1.05 to 1.95, and a ratio ($DP_b/DP_a$) of a number-average polymerization degree ($DP_b$) of the vinyl alcohol-based polymer block (B-b) to the number-average polymerization degree ($DP_a$) of the block copolymer is 0.010 to 0.999.

Here, the number-average polymerization degree ($DP_b$) of the vinyl alcohol-based polymer block (B-b) is preferably 450 to 5,000. It is also preferable that the content (R) of the acrylic acid-based monomer unit relative to all monomer units in the copolymer block (B-c) is 0.1 to 50.0 mol %.

It is also preferable that a content (Z) [mol %] of the acrylic acid-based monomer unit and a crystal melting temperature (Q) [° C.] of a polymer obtained by re-saponifying the block copolymer to a saponification degree of 99 mol % or more satisfy a formula (1) below.

$$2Z+Q \geq 225 \quad (1)$$

It is also preferable that the molar ratio (V) of a lactone ring to a total of an acrylic acid monomer unit and a lactone ring [a lactone ring/a total of an acrylic acid monomer unit and a lactone ring] in a polymer obtained by heat-treating the block copolymer in an acidic aqueous solution and then drying the block copolymer is 0.70 or more.

The problem described above is solved also by providing a method for producing the block copolymer described above, the method comprising: a polymerization step of performing polymerization of a vinyl ester and copolymerization of a vinyl ester and an acrylic acid ester by controlled radical polymerization in the presence of a radical initiator and an organic cobalt complex to obtain a vinyl ester-based block copolymer composed of a vinyl ester polymer block (B-b1) and a copolymer block (B-c1) comprising a vinyl ester monomer unit and an acrylic acid ester monomer unit; and a saponification step of saponifying the vinyl ester-based block copolymer obtained in the polymerization step to obtain a vinyl alcohol-based block copolymer composed of a vinyl alcohol-based polymer block (B-b) and a copolymer block (B-c) comprising a vinyl alcohol-based monomer unit and an acrylic acid-based monomer unit. Here, the acrylic acid ester is preferably methyl acrylate.

Effects of the Invention

The vinyl alcohol-based block copolymer of the present invention has a fine balance derived from the copolymer block (B-c) of having a superior solubility in water while being unlikely to undergo thickening or gelation due to pH fluctuation, and also has high mechanic strength derived from the vinyl alcohol-based polymer block (B-b). The production method of the present invention allows production of such a vinyl alcohol-based block copolymer.

MODES FOR CARRYING OUT THE INVENTION

The vinyl alcohol-based block copolymer of the present invention is one composed of a vinyl alcohol-based polymer block (B-b) and a copolymer block (B-c) comprising a vinyl alcohol-based monomer unit and an acrylic acid-based monomer unit, wherein a content (Z) of the acrylic acid-based monomer unit relative to all monomer units is 0.05 to 20.0 mol %, the block copolymer has a saponification degree of 80 to 99.99 mol %, the block copolymer has a number-average molecular weight ($Mn_a$) of 20,000 to 440,000, the block copolymer has a molecular weight distribution ($Mw_a/Mn_a$) of 1.05 to 1.95, and a ratio ($DP_b/DP_a$) of a number-average polymerization degree ($DP_b$) of the vinyl alcohol-based polymer block (B-b) to the number-average polymerization degree ($DP_a$) of the block copolymer is 0.010 to 0.999.

The vinyl alcohol-based block copolymer of the present invention is superior in water solubility, does not undergo thickening or gelation due to pH fluctuation, maintains a superior balance, and exhibits high mechanical strength. It is considered that the water solubility and the stability against pH fluctuation are caused by the copolymer block (B-c) comprising the vinyl alcohol-based monomer unit and the acrylic acid-based monomer unit that functions as a hydrophilic monomer unit, and the mechanical strength is caused by the vinyl alcohol-based polymer block (B-b).

A preferable method for producing the vinyl alcohol-based block copolymer of the present invention comprises a polymerization step of performing polymerization of a vinyl ester and copolymerization of a vinyl ester and an acrylic acid ester by controlled radical polymerization in the presence of a radical initiator and an organic cobalt complex to obtain a vinyl ester-based block copolymer composed of a vinyl ester polymer block (B-b1) and a copolymer block (B-c1) comprising a vinyl ester monomer unit and an acrylic acid ester monomer unit; and a saponification step of saponifying the vinyl ester-based block copolymer obtained in the polymerization step to obtain a vinyl alcohol-based block copolymer composed of a vinyl alcohol-based polymer block (B-b) and a copolymer block (B-c) comprising a vinyl alcohol-based monomer unit and an acrylic acid-based monomer unit. The production method is described below in detail.

Firstly, the polymerization step is described. In the polymerization step, polymerization of a vinyl ester and copolymerization of a vinyl ester and an acrylic acid ester are performed by controlled radical polymerization in the presence of a radical initiator and an organic cobalt complex. A vinyl ester polymer block (B-b1) is obtained by polymerizing a vinyl ester, and a copolymer block (B-c1) comprising a vinyl ester monomer unit and an acrylic acid ester monomer unit is obtained by randomly copolymerizing a vinyl ester and an acrylic ester.

The controlled radical polymerization employed in the production method of the present invention is polymerization reaction where reaction progresses in an equilibrium state between a propagating radical end (active species) and covalent species (dormant species) formed by the propagating radical end bonded with a control agent. In the production method of the present invention, an organic cobalt complex is preferably used as the control agent.

Examples of the polymerization method include known methods such as bulk polymerization, solution polymerization, suspension polymerization, and emulsion polymerization. Among all, bulk polymerization in which polymerization is conducted in a nonsolvent system or solution polymerization in which polymerization is conducted in various organic solvents is usually employed. In order to obtain a polymer having a narrow molecular weight distribution, a bulk polymerization method is preferable, which does not use a solvent or a dispersion medium having a possibility of causing side reactions such as chain transfer. Meanwhile, solution polymerization is sometimes preferred from the perspective of viscosity control of the reaction liquid, control of the polymerization rate, etc. Examples of the organic solvent used as the solvent in solution polymerization include esters such as methyl acetate and ethyl acetate; aromatic hydrocarbons such as benzene and toluene; lower alcohols such as methanol and ethanol; etc. Among them, esters and aromatic hydrocarbons are preferably used for preventing chain transfer. The amount of the solvent to be used may be determined in consideration of the viscosity of the reaction solution in accordance with the number-average molecular weight of a target block copolymer. For example, the amount is selected within a range of mass ratio (solvent/monomer) of from 0.01 to 10. The mass ratio (solvent/monomer) is preferably 0.1 or more and preferably 5 or less.

As the radical initiator to be used in the polymerization step, conventionally known azo initiators, peroxide initiators, redox initiators, etc. are appropriately selected. Examples of the azo initiators include 2,2'-azobisisobutyronitrile, 2,2'-azobis(2,4-dimethylvaleronitrile), and 2,2'-azobis(4-methoxy-2,4-dimethylvaleronitrile). Examples of the peroxide initiators include percarbonate compounds, such as diisopropyl peroxydicarbonate, di-2-ethylhexyl peroxydicarbonate, and diethoxyethyl peroxydicarbonate; perester compounds, such as t-butyl peroxyneodecanate, α-cumyl peroxyneodecanate, and t-butyl peroxyneodecanate; acetylcyclohexylsulfonyl peroxide; diisobutyryl peroxide; and 2,4,4-trimethylpentyl-2-peroxyphenoxy acetate. Furthermore, the above initiator can be combined with potassium persulfate, ammonium persulfate, hydrogen peroxide, or the like to be an initiator. Examples of the redox initiators include combinations of the above peroxides with reducing agents, such as sodium hydrogen sulfite, sodium hydrogen carbonate, tartaric acid, L-ascorbic acid, and Rongalite. The amount of the initiator used varies depending on the polymerization catalyst and is not unconditionally determined, and is arbitrarily selected according to the polymerization rate.

The organic cobalt complex to be used as a control agent in the polymerization step may be any one comprising a divalent cobalt atom and an organic ligand. Examples of preferable organic cobalt complexes include cobalt(II) acetylacetonate [$Co(acac)_2$] and a cobalt(II) porphyrin complex. Among them, cobalt(II) acetylacetonate is preferable from the viewpoint of production cost.

In the controlled radical polymerization used in the present invention, firstly, the radical initiator is decomposed to generate a radical and the radical is bonded with a small number of monomers to yield a short-chain polymer having a radical at a propagating end, and the radical is bonded with an organic cobalt(II) complex to yield a dormant species in which the organic cobalt(III) complex is covalently bonded with a polymer end. In a certain period after the start of the reaction, such a short-chain polymer is yielded only to be converted to dormant species and thus the polymerization degree substantially does not increase. This period is referred to as an induction period. After consumption of the organic cobalt(II) complex, a growth period begins in which the polymerization degree increases and most molecular chains in the reaction system have a molecular weight similarly increasing in proportion to polymerization time. This allows production of a vinyl ester-based block copolymer having a narrow molecular weight distribution. The time taken for the polymerization step of monomers in total of the induction period and the growth period is usually from 3 to 50 hours.

As described above, in the controlled radical polymerization of the present invention, one polymer chain is theoretically yielded from one molecule of the organic cobalt complex to be added. Accordingly, the amount of the organic cobalt complex to be added to the reaction liquid is determined in consideration of a desired number-average molecular weight and a desired polymerization ratio. Usually, it is preferable to use 0.001 to 1 mol of the organic cobalt complex based on 100 mol of the monomer.

A number of moles of the generated radical not more than the number of moles of the organic cobalt complex causes the polymerization reaction to progress only by a mechanism in which a cobalt complex is thermally dissociated from the dormant species, resulting in an extremely low polymerization rate depending on the reaction temperature. Therefore, considering that the radical initiator generates two radicals, the number of moles of the radical initiator to be used needs to be more than ½ times the number of moles of the organic cobalt complex. Since the amount of active radicals supplied from the initiator generally depends on the initiator efficiency, there are actually some initiator that is deactivated without being used for the formation of the dormant. Therefore, the number of moles of the radical initiator to be used is preferably 1 time or more, and more preferably 1.5 times or more the number of moles of the organic cobalt complex. Meanwhile, a number of moles of the generated radical excessively more than the number of moles of the organic cobalt complex causes an increase in the ratio of uncontrolled radical polymerization and thus the molecular weight distribution broadens. The number of moles of the radical initiator to be used is preferably 10 times or less, and more preferably 6 times or less the number of moles of the organic cobalt complex.

Examples of the vinyl ester to be used in the production method of the present invention include vinyl formate, vinyl acetate, vinyl trifluoroacetate, vinyl propionate, vinyl valerate, vinyl butyrate, vinyl isobutyrate, vinyl pivalate, vinyl caprate, vinyl laurate, vinyl stearate, vinyl benzoate, and vinyl versatate. From an economic perspective, vinyl acetate is preferably used.

Examples of the acrylic acid ester to be used in the production method of the present invention include methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate, and among them, methyl acrylate is preferable.

The vinyl alcohol-based block copolymer of the present invention may comprise a monomer unit derived from an ethylenically unsaturated monomer copolymerizable with the vinyl ester and the acrylic acid ester as long as the effects of the present invention are not impaired. Examples of the ethylenically unsaturated monomer include olefins such as ethylene, propylene, 1-butene, and isobutene; acrylamides such as acrylamide, N-alkyl (1 to 18 carbon atoms) acrylamides, N,N-dimethylacrylamide, 2-acrylamide propanesulfonate or salts thereof, and acrylamide propyldimethylamine or acid salts thereof or quaternary salts thereof; methacrylamides such as methacrylamide, N-alkyl (1 to 18 carbon atoms) methacrylamides, N,N-dimethylmethacrylamide, 2-methacrylamide propanesulfonate or salts thereof, and methacrylamide propyldimethylamine or acid salts thereof or quaternary salts thereof; N-vinylamides such as N-vinylpyrrolidone, N-vinylformamide, and N-vinylacetamide; vinyl cyanides such as acrylonitrile and methacrylonitrile; vinyl ethers such as alkyl (1 to 18 carbon atoms) vinyl ethers, hydroxyalkyl vinyl ethers, and alkoxyalkyl vinyl ethers; vinyl halides such as vinyl chloride, vinylidene chloride, vinyl fluoride, vinylidene fluoride, and vinyl bromide; vinyl silanes such as trimethoxyvinyl silane; allyl compounds such as allyl acetate, allyl chloride, allyl alcohol, and dimethylallyl alcohol; trimethyl-(3-acrylamide-3-dimethylpropyl)-ammonium chloride and acrylamide-2-methylpropanesulfonic acid.

In the block (B-b) and the block (B-c) constituting the vinyl alcohol-based block copolymer, the content of monomer units other than the vinyl alcohol-based monomer unit and the acrylic acid-based monomer unit relative to all monomer units in each block is preferably 10 mol % or less, more preferably 3 mol % or less, even more preferably 1 mol % or less, and particularly preferably substantially no such monomer unit is contained.

The method for mixing the radical initiator, the organic cobalt complex and the monomer is not particularly limited as long as the method is capable of generating the dormant species and controlling the increase in polymerization degree of the polymer. Examples of the method include a method comprising mixing the radical initiator and the organic cobalt complex, followed by mixing the thus-obtained mixture with the monomer; a method comprising mixing the radical initiator, the organic cobalt complex and the monomer at one time; and a method comprising mixing the organic cobalt complex and the monomer, followed by mixing the thus-obtained mixture with the radical initiator. The radical initiator, the organic cobalt complex, and the monomer may be mixed dividedly. Examples of such a method include a method in which the radical initiator, the organic cobalt complex, and a part of the monomer are mixed to generate a dormant species in which an organic cobalt(III) complex is covalently bonded with a short-chain polymer end, and then the dormant species and the rest of the monomer are mixed to increase the polymerization degree. The dormant species may be isolated as a macroinitiator, and then mixed with the rest of the monomer to increase the polymerization degree.

In the polymerization step, either the polymerization of the vinyl ester or the copolymerization of the vinyl ester and the acrylic acid ester may be performed first. When the polymerization of the vinyl ester is performed first, the polymerization of the vinyl ester is started by mixing the vinyl ester, and if necessary, another monomer other than the vinyl ester and the acrylic acid ester, the radical initiator, and the organic cobalt complex by the above-described method. It is preferable not to use an acrylic acid ester in polymerization of the vinyl ester. When the number-average polymerization degree of the vinyl ester polymer reaches a target value, an acrylic acid ester is added to the reaction liquid to start copolymerization of the remaining vinyl ester and the acrylic acid ester. At this time, if necessary, additional vinyl ester, acrylic acid ester, and monomer other than the vinyl ester may be added together with the acrylic acid ester. The number-average polymerization degree of the polymer can be checked by GPC (gel permeation chromatography), and specifically, a method described in Examples described later is adopted.

When the polymerization of the vinyl ester is first performed, in the case of obtaining a binary vinyl ester-based block copolymer having one vinyl ester polymer block (B-b1) and one copolymer block (B-c1) comprising a vinyl ester monomer unit and an acrylic acid ester monomer unit, the reaction is preferably terminated before the acrylic acid ester disappears. Meanwhile, in the case of obtaining a ternary or more multicomponent vinyl ester-based block copolymer, it is preferable to continue polymerization also after the acrylic acid ester disappears to form a vinyl ester polymer block (B-b1). By this method, a ternary vinyl ester-based block copolymer of block (B-b1)-block (B-c1)-block (B-b1) can be obtained. In the present invention, a part obtained by polymerizing the remaining vinyl ester in a state in which the molar ratio of the acrylic acid ester to the vinyl ester in the reaction liquid (acrylic acid ester/vinyl ester) is 0.00001 or less is defined as a vinyl ester polymer block (B-b1). The time point at which the molar ratio (acrylic acid ester/vinyl ester) reaches 0.00001 is determined by the method described in the Examples. When the number-average molecular weight of the vinyl ester-based block copolymer has reached a target value, the reaction is terminated, or in the case of obtaining a quaternary or more multicomponent vinyl ester-based block copolymer, an acrylic acid ester is added again to the reaction liquid to continue polymerization.

When the copolymerization of the vinyl ester and the acrylic acid ester is first performed in the polymerization step, the copolymerization of the vinyl ester and the acrylic acid ester is started by mixing the vinyl ester and the acrylic acid ester, and if necessary, another monomer other than the vinyl ester and the acrylic acid ester, a radical initiator, and an organic cobalt complex by the above-described method, and then the respective blocks are sequentially formed.

The polymerization temperature is preferably, 0° C. to 80° C., for example. A polymerization temperature of less than 0° C. causes an insufficient polymerization rate and thus productivity is prone to be reduced. In this regard, the polymerization temperature is more preferably 10° C. or more, and even more preferably 20° C. or more. Meanwhile, a polymerization temperature of more than 80° C. is prone to cause broadening of the molecular weight distribution of a resulting vinyl alcohol-based block copolymer obtained. In this regard, the polymerization temperature is more preferably 65° C. or less, and even more preferably 50° C. or less.

When the number-average polymerization degree or the polymerization ratio of the vinyl ester-based block copolymer reaches a target value in the polymerization step, it is preferable to perform a terminating step of terminating the polymerization reaction by adding a polymerization terminator. Examples of the polymerization terminator include 1,1-diphenylethylene; styrene compounds such as styrene, α-methylstyrene, and 4-tert-butylstyrene; aromatic hydroxy compounds such as p-methoxyphenol, hydroquinone, cresol, t-butyl catechol, and p-nitrosophenol; quinone compounds such as benzoquinone and naphthoquinone; conjugated carboxylic acids such as muconic acid and sorbic acid; thioethers such as phenothiazine, distearyl thiodipropionate, and dilauryl thiodipropionate; aromatic amines such as p-phenylenediamine and N-nitrosodiphenyl amine; nitroxides such as 2,2,6,6-tetramethylpiperidine 1-oxyl and 4-hydroxy-2,2,6,6-tetramethylpiperidine 1-oxyl; and transition metal salts such as copper acetate, copper dithiocarbamate, and manganese acetate. Among them, 1,1-diphenylethylene, sorbic acid, and benzoquinone are preferable, and 1,1-diphenylethylene is more preferable.

The number of moles of the polymerization terminator to be added is preferably 1 to 100 mol per mole of the organic cobalt complex added. An excessively small number of moles of the polymerization terminator causes a risk of not sufficiently trapping radicals at polymer ends to deteriorate color tone of the vinyl alcohol-based block copolymer to be obtained. Meanwhile, an excessively large number of moles of the polymerization terminator causes a risk of increasing production costs.

The temperature of the reaction liquid in the terminating step may be any temperature at which the polymerization terminator can react with a radical at the end of the vinyl ester-based block copolymer, and is preferably 0 to 80° C. The time required for the terminating step is usually 10 minutes to 5 hours.

It is preferable to perform, before the saponification step, an extraction step of bringing the obtained vinyl ester-based block copolymer solution into contact with an aqueous solution containing a water-soluble ligand to extract and remove a cobalt complex from the vinyl ester-based block copolymer solution. As just described, the saponification step performed after removal in advance of a cobalt complex contained in the vinyl ester-based block copolymer solution allows production of a vinyl alcohol-based block copolymer with good hue and less likely to be gelled. Specifically, such a copolymer can be obtained by performing an operation that involves vigorously stirring the aqueous solution and the vinyl ester-based block copolymer solution, which are mutually insoluble, to make their interface have an increased area, leaving them at rest to separate into an oil layer and a water layer, and then removing the water layer. This operation may be repeated a plurality of times.

The water-soluble ligand to be used in the extraction step is preferably an acid having a pKa of 0 to 12 at 25° C. When a strong acid having a pKa of less than 0 is used, it is difficult to efficiently extract the cobalt complex, and the pKa is preferably 2 or more. Also, when a weak acid having a pKa of more than 12 is used, it is difficult to efficiently extract the cobalt complex, and the pKa is preferably 7 or less. When the acid is a polyvalent acid, the first dissociation constant (pKa1) needs to be in the above range. The acid having a pKa of 0 to 12 is preferably a carboxylic acid or a phosphoric acid (pKa1 is 2.1), and more preferably a carboxylic acid. Among them, acetic acid (pKa is 4.76) is particularly preferable.

The pH of the aqueous solution containing the water-soluble ligand is preferably 0 to 5. The pH is more preferably 1 or more, and even more preferably 1.5 or more. The pH is more preferably 4 or less, and even more preferably 3 or less.

In the saponification step, the vinyl ester-based block copolymer obtained in the polymerization step is saponified to afford a vinyl alcohol-based block copolymer composed of a vinyl alcohol-based polymer block (B-b) and a copolymer block (B-c) comprising a vinyl alcohol-based monomer unit and an acrylic acid-based monomer unit.

In the saponification step, the vinyl ester-based block copolymer produced by the above-described method is saponified in a state of being dissolved in alcohol, and thus a vinyl alcohol-based block copolymer can be obtained. At this time, the vinyl ester monomer unit in the vinyl ester-based block copolymer can be converted into a vinyl alcohol monomer unit.

In addition, by adjusting the saponification conditions, the acrylic acid ester monomer unit can be converted into an acrylic acid monomer unit. From the viewpoint of improving the mechanical properties of the vinyl alcohol-based block copolymer, the molar ratio of the acrylic acid monomer unit to the total of the acrylic acid ester monomer unit and the acrylic acid monomer unit [the acrylic acid monomer unit/the total of the acrylic acid ester monomer unit and the acrylic acid monomer unit] in the vinyl alcohol-based block copolymer is preferably 0.5 or more, and more preferably 1.0.

Furthermore, depending on the saponification conditions, the acrylic acid ester monomer unit or the acrylic acid monomer unit may form a lactone ring with an adjacent vinyl alcohol monomer unit.

Examples of the alcohol to be used in the saponification reaction include lower alcohols such as methanol and ethanol, and methanol is particularly preferably used. The alcohol may be hydrous alcohol or dehydrated alcohol. The alcohol to be used in the saponification reaction may contain a solvent such as acetone, an ester such as methyl acetate or ethyl acetate, or toluene. Examples of the catalyst to be used in the saponification reaction include hydroxides of alkali metals such as potassium hydroxide and sodium hydroxide; alkali catalysts such as sodium methylate; and acid catalyst such as mineral acid. The temperature of the saponification reaction is suitably, for example, in the range of 20 to 70° C. When a gelatinous product is precipitated with progress of the saponification reaction, the product is ground at that timing and washed, followed by being dried to afford a vinyl alcohol-based block copolymer of the present invention.

The vinyl alcohol-based block copolymer of the present invention thus obtained is composed of a vinyl alcohol-based polymer block (B-b) and a copolymer block (B-c) comprising a vinyl alcohol-based monomer unit and an acrylic acid-based monomer unit. The vinyl alcohol-based block copolymer may be a binary block copolymer composed of one vinyl alcohol-based polymer block (B-b) and one copolymer block (B-c), or may be a ternary block copolymer composed of one vinyl alcohol-based polymer block (B-b) and two copolymer blocks (B-c) or composed of two vinyl alcohol-based polymer blocks (B-b) and one copolymer block (B-c), or may be a multicomponent block copolymer composed of four or more in total vinyl alcohol-based polymer blocks (B-b) and copolymer blocks (B-c). Among them, the vinyl alcohol-based block copolymer is preferably a binary block copolymer or a ternary block copolymer, and more preferably a binary block copolymer. The bonding form of the vinyl alcohol-based polymer block (B-b) with the copolymer block (B-c) is preferably linear.

The saponification degree of the vinyl alcohol-based block copolymer of the present invention is 80 to 99.99 mol %. In the present invention, the saponification degree refers to the ratio (mol %) of the total number of moles of the vinyl alcohol monomer unit and the unit derived from the vinyl alcohol monomer forming the lactone ring to the total number of moles of the vinyl ester monomer unit, the vinyl alcohol monomer unit, and the unit derived from the vinyl alcohol monomer forming the lactone ring in the vinyl alcohol-based block copolymer. A saponification degree of less than 80 mol % causes a severe decrease in crystallinity of the vinyl alcohol-based polymer block (B-b) and a decrease in physical properties such as mechanical strength and barrier properties of a film to be formed. The saponification degree is preferably 85 mol % or more, and more preferably 90 mol % or more. Meanwhile, when the saponification degree is more than 99.99 mol %, the production of the vinyl alcohol-based block copolymer tends to be difficult and the formability tends to be poor. Preferably, the saponification degree is 99.95 mol % or less. The saponification degree can be determined by $^1$H-NMR measurement of the vinyl alcohol-based block copolymer, and specifically, the method described in Examples is employed.

In the vinyl alcohol-based block copolymer of the present invention, the content (Z) of the acrylic acid-based monomer unit relative to all monomer units is 0.05 to 20.0 mol %. In the present invention, the acrylic acid-based monomer unit means an acrylic acid monomer unit, an acrylic acid ester monomer unit, and a lactone ring, and the total content of these monomer units needs to be within the above range. The vinyl alcohol-based block copolymer of the present invention is just required to comprise at least one acrylic acid-based monomer unit selected from the group consisting of an acrylic acid monomer unit, an acrylic acid ester monomer unit, and a lactone ring. When the content (Z) is less than 0.05 mol %, the solubility of the vinyl alcohol-based block copolymer in water may decrease. The content (Z) is preferably 0.2 mol % or more, more preferably 0.5 mol % or more, and even more preferably 3.0 mol % or more. Meanwhile, when the content (Z) is more than 20.0 mol %, the mechanical strength of a resulting film decreases. The content (Z) is preferably 18.0 mol % or less, and more preferably 14.0 mol % or less.

The content of the vinyl alcohol-based monomer unit relative to all monomer units in the vinyl alcohol-based polymer block (B-b) is preferably 90 mol % or more, more preferably 97 mol % or more, and even more preferably 99 mol % or more. In the present invention, the vinyl alcohol-based monomer unit means a vinyl ester monomer unit and a vinyl alcohol monomer unit, and the content of the vinyl alcohol-based monomer unit means the total content of the vinyl ester monomer unit and the vinyl alcohol monomer unit.

The content of the vinyl alcohol unit relative to all monomer units in the vinyl alcohol-based polymer block (B-b) is preferably 95 mol % or more, more preferably 98 mol % or more, and even more preferably 99 mol % or more.

The content of the acrylic acid-based monomer unit relative to all monomer units in the vinyl alcohol-based polymer block (B-b) is usually less than 0.1 mol %.

The content (R) of the acrylic acid-based monomer unit relative to all monomer units in the copolymer block (B-c) comprising the vinyl alcohol-based monomer unit and the acrylic acid-based monomer unit is preferably 0.1 to 50.0 mol %. When the content (R) is less than 0.1 mol %, the solubility of the vinyl alcohol-based block copolymer in water may decrease. The content (R) is more preferably 0.5 mol % or more, even more preferably 2 mol % or more, particularly preferably 5 mol % or more. Meanwhile, when the content (R) is more than 50.0 mol %, there is a possibility that the stability of the aqueous solution of the vinyl alcohol-based block copolymer against pH fluctuation decrease, or there is a possibility that a resulting film decreases in mechanical strength due to excessive increase in its swellability. The content (R) is more preferably 40.0 mol % or less, and even more preferably 30.0 mol % or less.

The vinyl alcohol-based block copolymer of the present invention has a number-average molecular weight ($Mn_a$) of 20,000 to 440,000. Use of an organic cobalt complex as a control agent allows production of a vinyl alcohol-based block copolymer having a narrow molecular weight distribution and a high number-average molecular weight ($Mn_a$). The number-average molecular weight ($Mn_a$) is preferably 30,000 or more, more preferably 40,000 or more, particularly preferably 50,000 or more, and most preferably 60,000 or more from the viewpoint of obtaining a film having high mechanical strength. Meanwhile, an excessively high number-average molecular weight ($Mn_a$) sometimes causes an excessively high viscosity of the solution and thus difficulty in handling or sometimes causes a decrease in the rate of dissolution. The number-average molecular weight ($Mn_a$) is thus preferably 220,000 or less. The number-average molecular weight ($Mn_a$) and the molecular weight distribution ($Mw_a/Mn_a$) are values determined by measuring the vinyl alcohol-based block copolymer with a hexafluoroisopropanol (HFIP)-based column using polymethyl methacrylate as a reference material by GPC. The measurement method is described in Examples.

The vinyl alcohol-based block copolymer of the present invention has a molecular weight distribution ($Mw_a/Mn_a$) of 1.05 to 1.95. Polymerization by controlled radical polymerization allows production of a vinyl alcohol-based block copolymer having a narrow molecular weight distribution. The molecular weight distribution ($Mw_a/Mn_a$) is preferably 1.80 or less, more preferably 1.65 or less, and even more preferably 1.55 or less. When the molecular weight distribution ($Mw_a/Mn_a$) is within the above range, the crystallinity of a resulting vinyl alcohol-based block copolymer is further increased, so that the mechanical strength and gas barrier properties of a resulting film are enhanced.

The ratio ($DP_b/DP_a$) of the number-average polymerization degree ($DP_b$) of the vinyl alcohol-based polymer block (B-b) to the number-average polymerization degree ($DP_a$) of the vinyl alcohol-based block copolymer needs to be 0.010 to 0.999. When the ratio ($DP_b/DP_a$) is less than 0.010, the mechanical strength and the gas barrier properties of a resulting film decrease. The ratio ($DP_b/DP_a$) is preferably 0.05 or more, more preferably 0.1 or more, and even more preferably 0.3 or more. Meanwhile, when the ratio ($DP_b/DP_a$) is more than 0.999, the solubility of the vinyl alcohol-based block copolymer in water may decrease. The ratio ($DP_b/DP_a$) is preferably 0.995 or less, more preferably 0.99 or less, and even more preferably 0.8 or less.

The number-average polymerization degree ($DP_a$) of the vinyl alcohol-based block copolymer is determined by performing GPC measurement and $^1$H-NMR measurement of the vinyl ester-based block copolymer after terminating the polymerization, and then calculating the number-average polymerization degree from the obtained number-average molecular weight of the vinyl ester-based block copolymer and the obtained contents of respective monomer units, and specifically, the method described in Examples described later is adopted.

The number-average polymerization degree ($DP_b$) of the vinyl alcohol-based polymer block (B-b) is determined by performing GPC measurement and, as necessary, $^1$H-NMR measurement of the polymer sampled from the reaction liquid during the polymerization, and then calculating the number-average polymerization degree from the obtained number-average molecular weight of the polymer and the obtained contents of respective monomer units, and specifically, the method described in Examples described later is adopted.

The number-average polymerization degree ($DP_b$) of the vinyl alcohol-based polymer block (B-b) is preferably 450 to 5,000. When the vinyl alcohol-based block copolymer contains a plurality of the vinyl alcohol-based polymer block (B-b), the total of the average polymerization degrees of the respective vinyl alcohol-based polymer blocks (B-b) is defined as a number-average polymerization degree ($DP_b$). When the number-average polymerization degree ($DP_b$) is less than 450, the mechanical strength of a resulting film may decrease. The number-average polymerization degree ($DP_b$) is preferably 600 or more, more preferably 800 or more, and even more preferably 1200 or more. Meanwhile, when the number-average polymerization degree ($DP_b$) is more than 5,000, water solubility may decrease. The number-average polymerization degree ($DP_b$) is more preferably 4,000 or less, and even more preferably 3,000 or less.

It is also preferable that the molar ratio (V) of a lactone ring to a total of an acrylic acid monomer unit and a lactone ring [a lactone ring/a total of an acrylic acid monomer unit and a lactone ring] in a polymer obtained by heat-treating the vinyl alcohol-based block copolymer in an acidic aqueous solution and then drying the block copolymer is 0.70 or more. The acrylic acid ester monomer unit is converted into an acrylic acid monomer unit by heat-treating the vinyl alcohol-based block copolymer in an acidic aqueous solution. By the above treatment, the acrylic acid monomer unit and the acrylic acid ester monomer unit which are adjacent to the vinyl alcohol monomer unit and capable of forming a lactone ring with the vinyl alcohol monomer unit are converted into a lactone ring. Meanwhile, when the acrylic acid ester monomer unit and the acrylic acid monomer unit are continuous, a lactone ring is not formed and remains as an acrylic acid monomer unit even when the treatment is performed. Accordingly, when the proportion of the portion in which the vinyl alcohol monomer unit and the acrylic acid monomer unit or the acrylic acid ester monomer unit are alternately arranged is large, that is, when the proportion of the portion in which the acrylic acid ester monomer unit and the acrylic acid monomer unit are continuous is small, the molar ratio (V) [the lactone ring/the total of the acrylic acid monomer unit and the lactone ring] is high. That is, the molar ratio (V) [the lactone ring/the total of the acrylic acid monomer unit and the lactone ring] is an index of the randomness of the copolymer block (B-c) comprising the vinyl alcohol-based monomer unit and the acrylic acid-based monomer unit. When the molar ratio (V) [the lactone ring/the total of the acrylic acid monomer unit and the lactone ring] is 0.70 or more, the stability of the vinyl alcohol-based block copolymer against pH fluctuation is further improved, and gelation and thickening are further less likely to occur even when the pH varies in an aqueous solution. The molar ratio (V) [the lactone ring/the total of the acrylic acid monomer unit and the lactone ring] is more preferably 0.80 or more. As the conditions for the heat treatment and drying of the vinyl alcohol-based block copolymer, the conditions described in Examples are employed.

The content (Z) [mol %] of the acrylic acid-based monomer unit in the vinyl alcohol-based block copolymer and the crystal melting temperature (Q) [° C.] of a polymer obtained by re-saponifying the vinyl alcohol-based block copolymer to a saponification degree of 99 mol % or more satisfy the formula (1) below, and further preferably satisfy the formula (2) below.

$$2Z+Q \geq 225 \quad (1)$$

$$2Z+Q \geq 230 \quad (2)$$

The vinyl alcohol-based block copolymer satisfying the formula (1), that is, the vinyl alcohol-based block copolymer having a high crystal melting temperature (Q) but having a large content (Z) of the acrylic acid-based monomer unit is excellent in the balance between water solubility or water absorbency and the mechanical strength of a coating film.

Usually, when a vinyl ester is randomly copolymerized with other monomers, the crystallinity of the resulting vinyl alcohol-based copolymer is extremely low, and it is difficult to achieve both the solubility in water and the strength of a resulting film. Meanwhile, in the vinyl alcohol-based block copolymer of the present invention, since the crystallinity of the vinyl alcohol-based polymer block (B-b) is good, it is expected that a high film strength is maintained even when the content of the acrylic acid-based monomer unit is large. Therefore, it is expected that the vinyl alcohol-based block copolymer can achieve both solubility in water or water absorbency and a high film strength. The vinyl alcohol-based block copolymer may form a phase separation structure. Even when the film obtained using the vinyl alcohol-based block copolymer has a phase separation structure, the crystallinity of the phase derived from the vinyl alcohol-based polymer block (B-b) is good, so that high mechanical strength is maintained.

The vinyl alcohol-based block copolymer is preferably water-soluble. Whether or not the vinyl alcohol-based block copolymer is water-soluble is determined by adding the vinyl alcohol-based block copolymer to ion-exchanged water such that it has a concentration of 4% by mass, then heating and stirring the mixture at 100° C., and determining whether or not the vinyl alcohol-based block copolymer is completely dissolved within 6 hours after heating.

Examples of the method for molding the vinyl alcohol-based block copolymer of the present invention include a method comprising forming the copolymer from the form of a solution in water, dimethyl sulfoxide or the like, and a method comprising plasticizing the vinyl alcohol-based block copolymer by heating and then forming the copolymer, for example, extrusion molding, injection molding, inflation molding, press molding, and blow molding. By these methods, shaped articles are obtained in an arbitrary shape, such as fiber, film, sheet, tube, and bottle.

Various additives may be blended in the vinyl alcohol-based block copolymer of the present invention as long as the effects of the present invention are not impaired. Examples of the additives include fillers, process stabilizers such as a copper compound, weathering agents, colorants, ultraviolet absorbers, light stabilizers, antioxidants, antistatic agents, flame retardants, plasticizers, other resins such as starch, lubricants, perfumes, defoamers, deodorants, extenders, removers, mold releases, reinforcements, crosslinkers, mildewcides, antiseptics, and crystallization retardants.

The vinyl alcohol-based block copolymer of the present invention can be used for various applications by utilizing its properties. Examples of such use include surfactants, paper coating agents, paper internal agents, pigment binders, adhesives, nonwoven fabric binders, paints, fiber treating agents, fiber sizings, dispersion stabilizers, films (optical films, water-soluble films), sheets, bottles, fibers, thickeners, flocculants, soil improvers, etc.

EXAMPLES

[Number-Average Molecular Weight (Mn) and Molecular Weight Distribution (Mw/Mn)]

Using a size exclusion high speed liquid chromatograph "HLC-8320GPC" manufactured by Tosoh Corp., a number-average molecular weight (Mn) and a molecular weight distribution (Mw/Mn) of polymers were measured. Measurement conditions were as follows.

Column: two HFIP columns "GMHHR-H(S)" manufactured by Tosoh Corp., serial connection
Reference material: polymethylmethacrylate
Solvent and mobile phase: sodium trifluoroacetate-HFIP solution (concentration: 20 mM)
Flow rate: 0.2 mL/min.
Temperature: 40° C.
Sample solution concentration: 0.1 mass % (filtered through a filter having an opening diameter of 0.45 μm)
Injection amount: 10 μL
Detector: RI

[Content (U) of Acrylic Acid Ester Monomer Unit in Vinyl Ester-Based Block Copolymer]

The content (U) (mol %) of the acrylic acid ester monomer unit in the vinyl ester-based block copolymer was determined by the following method. $^1$H-NMR measurement of the vinyl ester-based block copolymer was performed. The content (U) (mol %) of the acrylic acid ester monomer unit in the vinyl ester-based block copolymer was calculated by the following formula, where T was the integral value (4.8 ppm) of the peak derived from the methine proton (—CH$_2$CH(OCOCH$_3$)—) of the vinyl acetate monomer unit, and S was the integral value (3.6 ppm) of the peak derived from the side chain protons (—CH$_2$CH(COOCH$_3$)—) of the methyl acrylate monomer unit.

$$(U) \text{ (mol \%)}=(S/3)/(S/3+T) \times 100$$

[Number-Average Polymerization Degree $DP_a$ of Vinyl Alcohol-Based Block Copolymer and Number-Average Polymerization Degree $DP_b$ of Vinyl Alcohol-Based Polymer Block (B-b)]

The number-average polymerization degree $DP_b$ of the vinyl alcohol-based polymer block (B-b) in the vinyl alcohol-based block copolymer was determined as follows.

The vinyl alcohol-based polymer block (B-b) is formed by saponifying the vinyl ester polymer block (B-b1) in the vinyl ester-based block copolymer. Since the number-average polymerization degree $DP_b$ of the polymer substantially does not change before and after saponification, the number-average polymerization degree determined from the result of GPC measurement of the polymer before saponification was defined as the number-average polymerization degree $DP_b$ of the vinyl alcohol-based polymer block (B-b). Similarly, after the polymerization was terminated, the number-average polymerization degree determined from the result of GPC measurement of the polymer before saponification was defined as the number-average polymerization degree $DP_a$ of the vinyl alcohol-based block copolymer.

Here, the vinyl ester polymer block (B-b1) refers to a block obtained by polymerizing a vinyl ester in the absence of an acrylic acid ester, and a block obtained by polymerizing a vinyl ester in the presence of an acrylic acid ester at the initial stage of polymerization or during polymerization to obtain a copolymer block (B-c1) comprising a vinyl ester monomer unit and an acrylic acid ester monomer unit, and then polymerizing a vinyl ester monomer in a state where the acrylic acid ester is consumed earlier than the vinyl ester and the molar ratio of the acrylic acid ester to the vinyl ester in the reaction liquid (acrylic acid ester/vinyl ester) is 0.00001 or less.

The boundary between the "vinyl ester polymer block (B-b1)" and the "copolymer block (B-c1) comprising a vinyl ester monomer unit and an acrylic acid ester monomer unit" was determined as follows. Sampling was appropriately performed during the polymerization, the number-average polymerization degree (DP) of the polymer and the content (U) (mol %) of the acrylic acid ester monomer at the time point of each sampling were measured by GPC and $^1$H-NMR, and the time point when the molar ratio (acrylic acid ester/vinyl ester) reached 0.00001 was determined by simulation using the Mayo-Lewis formula as a copolymerization theoretical formula and the value of the reactivity ratio ($r_{VAc}$=0.01, $r_{MA}$=30). At this time, the content of the acrylic acid ester monomer unit contained in the vinyl ester polymer block formed after the time point when the molar ratio (acrylic acid ester/vinyl ester) reached 0.00001 is less than 0.1 mol %.

The number-average polymerization degree (DP) of the sampled polymer was determined by the following formula using the number-average molecular weight Mn of the polymer determined by GPC and $^1$H-NMR, the content (U) (mol %) of the acrylic acid ester monomer unit, and the molecular weights of the acrylic acid ester monomer unit and the vinyl ester monomer unit (methyl acrylate: 86, vinyl acetate: 86).

$$(DP) = Mn/\{(U/100) \times 86 + [(100 - U)/100] \times 86\}$$
$$= Mn/86$$

The number-average polymerization degree $DP_a$ of the vinyl alcohol-based block copolymer was determined from the above formula using values determined by GPC and $^1$H-NMR of the vinyl ester-based block copolymer after the polymerization was terminated. In the case of obtaining a vinyl ester polymer block at the beginning of polymerization, a polymer sampled immediately before adding an acrylic acid ester was measured to determine the number-average polymerization degree $DP_b$ of the vinyl alcohol-based polymer block (B-b). In the case of performing copolymerization of an acrylic acid ester and a vinyl ester and then obtaining a vinyl ester polymer block, the number-average polymerization degree $DP_b$ of the vinyl alcohol-based polymer block (B-b) was determined from the difference in number-average polymerization degree between the polymer sampled at the time point as the boundary of blocks and the polymer sampled immediately before the subsequent addition of an acrylic acid ester.

[Content (Z) (Mol %) of Acrylic Acid-Based Monomer Unit in Vinyl Alcohol-Based Block Copolymer]

The vinyl alcohol-based block copolymer was stirred at 100° C. for 1 hour in an aqueous hydrochloric acid solution of pH2 and then dried up at 120° C., and thereby the acrylic acid-based monomer units were converted into acrylic acid monomer units or lactone ring structure (the lactone ring is formed through a reaction of an acrylic acid monomer unit or an acrylic acid ester monomer unit with a vinyl alcohol monomer unit adjacent thereto). The copolymer was washed with methanol to remove salts, then dried under reduced pressure at 90° C. for 2 days, and then subjected to $^1$H-NMR measurement at 40° C. and 95° C. using a nuclear magnetic resonance spectrometer "LAMBDA 500" manufactured by JEOL Ltd. DMSO-$d_6$ was used as a solvent. The content (Z) (mol %) of the acrylic acid-based monomer unit relative to all monomer units of the vinyl alcohol-based block copolymer was calculated as follows.

The content (Z) (mol %) of [acrylic acid-based monomer unit] relative to [all monomer units of the vinyl alcohol-based block copolymer] was calculated from the following formula, where Y was the integrated value (a broad peak detected in the range of 11.0 to 13.0 ppm) of a peak derived from a side chain proton (—$CH_2CH(COOH)$—) of acrylic acid, X was the total integrated value (a double peak of 2.6 ppm to 3.0 ppm) of a peak derived from a methine proton (—$CH_2CH(R_1)CH_2CH(R_2)$—) of the main chain of acrylic acid in the lactone ring, wherein $R_1$ and $R_2$ form a linkage (—$R_1$-$R_2$—) with each other, and —$R_1$-$R_2$— means a —CO—O— structure, W was the total integrated value (a peak of 3.6 ppm to 4.0 ppm) of a peak derived from a methine proton (—$CH_2CH(OH)$—) of vinyl alcohol, and P was the integrated value (1.9 ppm to 2.0 ppm) of a peak derived from side chain protons (—$CH_2CH(OCOCH_3)$—) of vinyl acetate.

In the lactone ring, one acrylic acid-based monomer unit and one vinyl alcohol monomer unit adjacent thereto react together to form one molecule of a lactone ring. In consideration of this, in the following formula, the coefficient of X of the denominator is set to 2, and the coefficient of X of the numerator is set to 1.

$(Z)$ (mol %) = [acrylic acid–based monomer unit (molar content)]/[all monomer units of vinyl alcohol–based block copolymer (molar content)] × 100

$= (X + Y)/(W + 2X + Y + (P/3)) \times 100$

The molar ratio (V) of the lactone ring to the total of the acrylic acid monomer unit and the lactone ring [the total of the lactone ring/the acrylic acid monomer unit and the lactone ring] in the polymer prepared by heat-treating the vinyl alcohol-based block copolymer in an acidic aqueous solution and then drying the vinyl alcohol-based block copolymer was calculated by the following formula using the above X and Y.

$$(V) = [\text{lactone ring}]/[\text{total of acrylic acid monomer unit and lactone ring}]$$
$$= X/(X + Y)$$

[Content (R) of Acrylic Acid-Based Monomer Unit in Copolymer Block (B-c) Comprising Vinyl Alcohol-Based Monomer Unit and Acrylic Acid-Based Monomer Unit]

The content (R) (mol %) of the acrylic acid-based monomer unit relative to all monomer units in the copolymer block (B-c) in the vinyl alcohol-based block copolymer was calculated from the following formula using the number-average polymerization degree $DP_a$ of the vinyl alcohol-based block copolymer and the number-average polymerization degree $DP_b$ of the vinyl alcohol-based polymer block (B-b).

$$(R) \text{ (mol \%)} = (Z) \times DP_a/(DP_a - DP_b)$$

[Saponification Degree]

The saponification degree (mol %) of the vinyl alcohol-based block copolymer was calculated by the following formula, where X was the total integrated value (a double peak of 2.6 ppm to 3.0 ppm) of a peak derived from a methine proton (—CH$_2$CH(R$_1$)CH$_2$CH(R$_2$)—) of acrylic acid in the main chain in the lactone ring, wherein R$_1$ and R$_2$ form a linkage (—R$_1$-R$_2$—) with each other, and —R$_1$-R$_2$— means a —CO—O— structure, W was the total integrated value (a peak of 3.6 ppm to 4.0 ppm) of a peak derived from a methine proton (—CH$_2$CH(OH)—) of vinyl alcohol, and P was the integrated value (1.9 ppm to 2.0 ppm) of a peak derived from side chain protons (—CH$_2$CH(OCOCH$_3$)—) of vinyl acetate.

Saponification degree (mol %) = 100 − [(total number of moles of)
vinyl acetate monomer unit]/
[(total number of moles of) unit
derived from vinyl alcohol
monomer forming lactone ring +
vinyl alcohol monomer unit +
vinyl acetate monomer unit] × 100
= 100 − (P/3)/(X + W + (P/3)) × 100

[Crystal Melting Temperature (Q)]

To 100 parts by mass of the vinyl alcohol-based block copolymer were added 1860 parts by mass of methanol and 50 parts by mass of sodium hydroxide, and the mixture was heated at 40° C. for 2 hours to completely saponify the remaining acetic acid groups (saponification degree ≥99.9 mol %). When the saponification was insufficient, additional sodium hydroxide was added to continue the reaction until the remaining acetic acid groups were completely saponified. Next, a phenolphthalein solution was added, and the reaction mixture was washed with methanol until no alkaline reaction was observed in the washing, and then sodium hydroxide and sodium acetate were removed. The washed polymer was dried up at 120° C. until methanol disappeared, thereby affording a vinyl alcohol-based block copolymer for crystal melting temperature measurement.

The crystal melting temperature of the vinyl alcohol-based block copolymer under a nitrogen atmosphere was measured using a differential scanning calorimeter "DSC 25" manufactured by TA Instruments. The vinyl alcohol-based block copolymer (3 mg) dried under reduced pressure at 90° C. for 2 days was sealed in an aluminum container and set in the differential scanning calorimeter. The temperature was raised from 40° C. to 250° C. at a rate of 10° C. per minute, then held for 1 minute, then lowered to minus 80° C. at a rate of 10° C. per minute, and then held for 1 minute. Thereafter, the temperature was raised to 250° C. at a rate of 10° C. per minute, and during this course, an endothermic peak was observed between 150° C. and 250° C. The temperature of the local maximum point on the peak was defined as (Q) (° C.).

[Rate of Dissolution in Water]

A vinyl alcohol-based block copolymer was added to ion-exchanged water to have a concentration of 4 mass %, and was heated at 100° C. and stirred to be dissolved. The dissolution performance was evaluated by the following criteria.

A: The copolymer was completely dissolved within 6 hours from the start of the heating and stirring.

B: The copolymer was not completely dissolved within 6 hours from the start of the heating and stirring.

[Aqueous Solution Viscosity Stability with Respect to pH]

A vinyl alcohol-based block copolymer was added to ion-exchanged water to have a concentration of 4 mass %, and was heated at 100° C. and stirred to be dissolved. Then, the pH was adjusted to 2 or 12 using an aqueous hydrochloric acid solution or an aqueous sodium hydroxide solution, and the mixture was further stirred at 20° C. for 1 hour. The aqueous solution viscosity stability with respect to pH was evaluated by the following criteria. When the criterion A is satisfied, the aqueous solution viscosity stability can be judged to be high and good.

A: When the fluidity of an aqueous solution was compared between pH 2 and pH 12, there was no significant difference in the viscosity of the aqueous solution.

B: When the fluidity of an aqueous solution was compared between pH 2 and pH 12, there was a significant difference in the viscosity of the aqueous solution.

[Percentage of Saturated Water Content]

An aqueous vinyl alcohol-based block copolymer solution with a concentration of 10 mass % was prepared and casted in a mold made of PET to be left standing in a room controlled at 20° C., 21% RH for 1 week for drying. A film thus obtained was removed from the mold and a central film thickness was measured with a thickness gauge to determine a film with a film thickness of 100 μm as an evaluation object. The film obtained was conditioned at 20° C., 80% RH for 1 week and then a part of the film was cut out to measure the percentage [mass %] of saturated water content of the film with a halogen moisture analyzer (setting temperature: 150° C.).

[Mechanical Properties]

The film used for the evaluation of the percentage of saturated water content and left standing at 20° C., 80% RH for 1 week for drying was cut out in 10 mm×800 mm and subjected to strength-elongation measurement using an autograph "AG-IS" manufactured by Shimadzu Corp. in the conditions of a distance between chucks of 50 mm and a tensile speed of 500 mm/min. to determine a modulus of elasticity [kgf/mm$^2$] in the conditions of 20° C., 80% RH.

The measurement was performed five times for each sample and an average of them was calculated.

Example 1

To a reactor provided with a stirrer, a reflux condenser tube, and an initiator addition port were added 0.24 parts by mass of cobalt(II) acetylacetonate [Co(acac)$_2$] and 0.86 parts by mass of V-70 [2,2'-azobis(4-methoxy-2,4-dimethylvaleronitrile)] as an initiator. Inert gas purge was performed three times in which the inside of the reactor was vacuumed and then nitrogen was introduced. After that, 640 parts by mass of vinyl acetate (VAc) purified by simple distillation was added, followed by immersion of the reactor in a water bath and heating to have an internal temperature of 30° C. and stirring. Sampling was appropriately performed and the progress of the polymerization was checked from the solid concentration. When the conversion of vinyl acetate reached 19 mass %, 1.2 parts by mass of methyl acrylate (MA) was added. The number-average molecular weight (Mn) of the polymer at a conversion of 19 mass % was 128,100. Subsequently, sampling was appropriately performed, the progress of the polymerization was checked from the solid concentration, and when the total conversion of vinyl acetate and methyl acrylate reached 22 mass %, 0.84 parts by mass of 1,1-diphenylethylene (1,1-DPEt) was added as a polymerization inhibitor. The induction period was 7 hours and the growth period was 4 hours.

After the addition of the polymerization inhibitor, the internal temperature was raised to 60° C., followed by heating and mixing for 1 hour, and 600 parts by mass of an aqueous acetic acid solution (pH of 2.0) with a concentration of 25 mass % was further added thereto and stirred for 5 minutes. Thereafter, the mixture was left standing for 30 minutes to be separated into two layers, and the aqueous layer was removed. The reactor was connected to a vacuum line, and unreacted monomers were distilled off under reduced pressure at 30° C., then methanol was added to dissolve the polymer, and the solution was added dropwise to deionized water to precipitate a vinyl ester-based block copolymer. The vinyl ester-based block copolymer was collected by filtration operation and dried in a vacuum dryer at 40° C. for 24 hours to afford a vinyl ester-based block copolymer. Details of the above polymerization step are shown in Table 1.

Then, to a reactor same as above were added and dissolved 100 parts by mass of the vinyl ester-based block copolymer obtained and 334.2 parts by mass of dehydrated methanol, and then the water bath was heated and the solution was heated and stirred until the internal temperature reached 40° C. Thereto was added 65.8 parts by mass of a methanol solution of sodium hydroxide (concentration: 14 mass %, 9.2 parts by mass as sodium hydroxide). The thus-prepared vinyl ester-based block copolymer solution having a concentration of 20 mass % was subjected to a saponification reaction at 40° C. The gel product thus generated was ground with a grinder and further left at 40° C. for progress of saponification for 1 hour. To the saponified product obtained were added 50.0 parts by mass of dehydrated methanol and 0.2 parts by mass of ion-exchanged water, and heating was further continued at 65° C. for 1 hour. After that, acetic acid was added to adjust the pH to 5, and then the mixture was separated by filtration to obtain a solid. Then, 500 parts by mass of methanol was added thereto and was heated and refluxed for 1 hour. After that, the solid obtained by centrifugal dewatering was dried in a vacuum dryer at 40° C. for 24 hours to afford a desired vinyl alcohol-based block copolymer (a binary block copolymer of vinyl alcohol-based polymer block (B-b)-copolymer block (B-c)). Details of the above saponification step are shown in Table 2.

Various properties of the vinyl alcohol-based block copolymer thus obtained were measured to evaluate the performance. The vinyl alcohol-based block copolymer had a number-average molecular weight (Mn$_a$) of 77,200 and a number-average polymerization degree (DP$_a$) of 1750. The vinyl alcohol-based polymer block (B-b) in the vinyl alcohol-based block copolymer had a number-average polymerization degree (DP$_b$) of 1490. The block copolymer had a ratio (DP$_b$/DP$_a$) of 0.851, a molecular weight distribution (Mw$_a$/Mn$_a$) of 1.40, and a saponification degree of 99.8 mol %. The molecular weight distribution (Mw$_a$/Mn$_a$) was determined from the result of GPC measurement of the vinyl alcohol-based block copolymer. The content (Z) of the acrylic acid-based monomer unit was 0.9 mol %, the content (R) of the acrylic acid-based monomer unit in the "copolymer block (B-c) comprising a vinyl alcohol-based monomer and an acrylic acid-based monomer" was 5.8 mol %. The crystal melting temperature (Q) was 228.0° C. and the value of 2Z+Q was 230. In the polymer prepared by heat-treating the vinyl alcohol-based block copolymer in an acidic aqueous solution and then drying the block copolymer, the molar ratio (V) of the lactone ring to the total of the acrylic acid monomer unit and the lactone ring [the lactone ring/the total of the acrylic acid monomer unit and the lactone ring] was 1.00. The evaluation of the rate of dissolution in water was A, and the evaluation of the aqueous solution viscosity stability with respect to pH was A. The percentage of saturated water content was 14.0 mass %, and the modulus of elasticity was 17.1 kgf/mm$^2$. The above results are summarized in Table 3.

Example 2

Polymerization of vinyl acetate was initiated in the same manner as in Example 1. Sampling was appropriately performed and the progress of the polymerization was checked from the solid concentration. When the conversion of vinyl acetate reached 9 mass %, 16.0 parts by mass of methyl acrylate was added. The number-average molecular weight (Mn) of the polymer at a conversion of 9 mass % was 60,100. Subsequently, sampling was appropriately performed, the progress of the polymerization was checked from the solid concentration, and when the total conversion of vinyl acetate and methyl acrylate reached 12 mass %, 0.50 parts by mass of p-benzoquinone was added as a polymerization inhibitor. The induction period was 7 hours and the growth period was 2 hours. After the addition of the polymerization inhibitor, the same operation as in Example 1 was performed to afford a vinyl ester-based block copolymer. Details of the above polymerization step are shown in Table 1.

Then, to a reactor same as above were added and dissolved 100 parts by mass of the vinyl ester-based block copolymer obtained and 388.3 parts by mass of dehydrated methanol, and then the water bath was heated and the solution was heated and stirred until the internal temperature reached 40° C. Thereto was added 11.3 parts by mass of a methanol solution of sodium hydroxide (concentration: 14 mass %, 1.6 parts by mass as sodium hydroxide). The thus-prepared vinyl ester-based block copolymer solution having a concentration of 20 mass % was subjected to a saponification reaction at 40° C. The gel product thus generated was ground with a grinder and further left at 40°

C. for progress of saponification for 1 hour. To the saponified product obtained were added 50.0 parts by mass of dehydrated methanol and 3.1 parts by mass of ion-exchanged water, and heating was further continued at 40° C. for 1 hour.

Thereafter, a desired vinyl alcohol-based block copolymer (a binary block copolymer of vinyl alcohol-based polymer block (B-b)-copolymer block (B-c)) was obtained in the same manner as in Example 1. Details of the saponification step are shown in Table 2. The results of the measurement and evaluation of the vinyl alcohol-based block copolymer obtained are summarized in Table 3.

Example 3

Polymerization of vinyl acetate and methyl acrylate was initiated in the same manner as in Example 1 except that 2.4 parts by mass of methyl acrylate was added together with vinyl acetate. Sampling was appropriately performed, the progress of the polymerization was checked from the solid concentration, and GPC measurement and $^1$H-NMR measurement of the sampled polymer were performed. It was confirmed by $^1$H-NMR that the methyl acrylate monomer was completely consumed when the total conversion of vinyl acetate and methyl acrylate was 5% [the molar ratio (acrylic acid ester/vinyl ester) was less than 0.00001]. The number-average molecular weight (Mn) at this time was 34,500. Subsequently, polymerization was performed, and when the total conversion of vinyl acetate and methyl acrylate reached 14 mass %, 2.4 parts by mass of methyl acrylate was added. The number-average molecular weight (Mn) at a conversion of 14 mass % was 94,500. Subsequently, sampling was appropriately performed, the progress of the polymerization was checked from the solid concentration, and when the total conversion of vinyl acetate and methyl acrylate reached 19 mass %, 0.84 parts by mass of 1,1-diphenylethylene was added as a polymerization inhibitor. The induction period was 7 hours and the growth period was 3 hours. After the addition of the polymerization inhibitor, the same operation as in Example 1 was performed to afford a vinyl ester-based block copolymer. Details of the above polymerization step are shown in Table 1.

Then, to a reactor same as above were added and dissolved 100 parts by mass of the vinyl ester-based block copolymer obtained and 336.9 parts by mass of dehydrated methanol, and then the water bath was heated and the solution was heated and stirred until the internal temperature reached 40° C. Thereto was added 63.1 parts by mass of a methanol solution of sodium hydroxide (concentration: 14 mass %, 8.8 parts by mass as sodium hydroxide). The thus-prepared vinyl ester-based block copolymer solution having a concentration of 20 mass % was subjected to a saponification reaction at 40° C. The gel product thus generated was ground with a grinder and further left at 40° C. for progress of saponification for 1 hour. To the saponified product obtained were added 50.0 parts by mass of dehydrated methanol and 1.0 part by mass of ion-exchanged water, and heating was further continued at 65° C. for 1 hour.

Thereafter, a desired vinyl alcohol-based block copolymer (a ternary block copolymer of copolymer block (B-c)-vinyl alcohol-based polymer block (B-b)-copolymer block (B-c)) was obtained in the same manner as in Example 1. Details of the saponification step are shown in Table 2. The results of the measurement and evaluation of the vinyl alcohol-based block copolymer obtained are summarized in Table 3.

Example 4

To a reactor provided with a stirrer, a reflux condenser tube, and an initiator addition port were added 0.10 parts by mass of cobalt(II) acetylacetonate and 0.34 parts by mass of V-70 [2,2'-azobis(4-methoxy-2,4-dimethylvaleronitrile)] as an initiator. Inert gas purge was performed three times in which the inside of the reactor was vacuumed and then nitrogen was introduced. After that, 640 parts by mass of vinyl acetate purified by simple distillation and 160 parts by mass of methyl acetate were added, followed by immersion of the reactor in a water bath and heating to have an internal temperature of 30° C. and stirring. Sampling was appropriately performed, and the progress of the polymerization was checked from the solid concentration. When the conversion of vinyl acetate reached 15 mass %, 6.4 parts by mass of methyl acrylate was added. The number-average molecular weight (Mn) of the polymer at a conversion of 15 mass % was 257,100. Subsequently, sampling was appropriately performed, the progress of the polymerization was checked from the solid concentration, and when the total conversion of vinyl acetate and methyl acrylate reached 20 mass %, 0.33 parts by mass of 1,1-diphenylethylene was added as a polymerization inhibitor. The induction period was 4 hours and the growth period was 3 hours. After the addition of the polymerization inhibitor, the same operation as in Example 1 was performed to afford a vinyl ester-based block copolymer. Details of the above polymerization step are shown in Table 1.

Then, to a reactor same as above were added and dissolved 100 parts by mass of the vinyl ester-based block copolymer obtained and 396.8 parts by mass of dehydrated methanol, and then the water bath was heated and the solution was heated and stirred until the internal temperature reached 40° C. Thereto was added 3.2 parts by mass of a methanol solution of sodium hydroxide (concentration: 14 mass %, 0.4 parts by mass as sodium hydroxide). The thus-prepared vinyl ester-based block copolymer solution having a concentration of 20 mass % was subjected to a saponification reaction at 40° C. The gel product thus generated was ground with a grinder and further left at 40° C. for progress of saponification for 1 hour. To the saponified product obtained were added 50.0 parts by mass of dehydrated methanol and 1.0 part by mass of ion-exchanged water, and heating was further continued at 40° C. for 1 hour.

Thereafter, a desired vinyl alcohol-based block copolymer (a binary block copolymer of vinyl alcohol-based polymer block (B-b)-copolymer block (B-c)) was obtained in the same manner as in Example 1. Details of the saponification step are shown in Table 2. The results of the measurement and evaluation of the vinyl alcohol-based block copolymer obtained are summarized in Table 3.

Example 5

Polymerization of vinyl acetate was initiated in the same manner as in Example 1 except that 0.96 parts by mass of cobalt(II) acetylacetonate and 3.44 parts by mass of V-70 [2,2'-azobis(4-methoxy-2,4-dimethylvaleronitrile)] as an initiator were added. Sampling was appropriately performed, and the progress of the polymerization was checked from the solid concentration. When the conversion of vinyl acetate reached 20 mass % and 24 mass %, 1.6 parts by mass of methyl acrylate was added. The number-average molecular weight (Mn) of the polymer at a conversion of 20 mass % was 34,400. Subsequently, sampling was appropriately performed, the progress of the polymerization was checked from the solid concentration, and when the total conversion of vinyl acetate and methyl acrylate reached 28 mass %, 3.35 parts by mass of 1,1-diphenylethylene was added as a polymerization inhibitor. The induction period was 12 hours and the growth period was 3 hours. After the addition of the polymerization inhibitor, the same operation as in Example 1 was performed to afford a vinyl ester-based block copolymer. Details of the above polymerization step are shown in Table 1.

Then, to a reactor same as above were added and dissolved 100 parts by mass of the vinyl ester-based block copolymer obtained and 335.0 parts by mass of dehydrated methanol, and then the water bath was heated and the solution was heated and stirred until the internal temperature reached 40° C. Thereto was added 65.0 parts by mass of a methanol solution of sodium hydroxide (concentration: 14 mass %, 9.1 parts by mass as sodium hydroxide). The thus-prepared vinyl ester-based block copolymer solution having a concentration of 20 mass % was subjected to a saponification reaction at 40° C. The gel product thus generated was ground with a grinder and further left at 40° C. for progress of saponification for 1 hour. To the saponified product obtained were added 50.0 parts by mass of dehydrated methanol and 0.4 parts by mass of ion-exchanged water, and heating was further continued at 65° C. for 1 hour.

Thereafter, a desired vinyl alcohol-based block copolymer (a binary block copolymer of vinyl alcohol-based polymer block (B-b)-copolymer block (B-c); in the preparation of the copolymer block (B-c), methyl acrylate was added in two portions) was obtained in the same manner as in Example 1. Details of the saponification step are shown in Table 2. The results of the measurement and evaluation of the vinyl alcohol-based block copolymer obtained are summarized in Table 3.

Example 6

A desired vinyl alcohol-based block copolymer was obtained in the same manner as in Example 1 except that dehydrated methanol and ion-exchanged water were not added to a saponified product obtained by progressing saponification at 40° C. for 1 hour. Details of the saponification step are shown in Table 2. The results of the measurement and evaluation of the vinyl alcohol-based block copolymer obtained are summarized in Table 3.

Example 7

Polymerization of vinyl acetate was initiated in the same manner as in Example 1. Sampling was appropriately performed, and the progress of the polymerization was checked from the solid concentration. When the conversion of vinyl acetate reached 19 mass %, 49.0 parts by mass of methyl acrylate was added. The number-average molecular weight (Mn) of the polymer at a conversion of 19 mass % was 128,100. Subsequently, sampling was appropriately performed, the progress of the polymerization was checked from the solid concentration, and when the total conversion of vinyl acetate and methyl acrylate reached 30 mass %, 0.84 parts by mass of 1,1-diphenylethylene was added as a polymerization inhibitor. The induction period was 7 hours and the growth period was 4 hours. After the addition of the polymerization inhibitor, the same operation as in Example 1 was performed to afford a vinyl ester-based block copolymer. Details of the above polymerization step are shown in Table 1.

Then, to a reactor same as above were added and dissolved 100 parts by mass of the vinyl ester-based block copolymer obtained and 334.2 parts by mass of dehydrated methanol, and then the water bath was heated and the solution was heated and stirred until the internal temperature reached 40° C. Thereto was added 65.8 parts by mass of a methanol solution of sodium hydroxide (concentration: 14 mass %, 9.2 parts by mass as sodium hydroxide). The thus-prepared vinyl ester-based block copolymer solution having a concentration of 20 mass % was subjected to a saponification reaction at 40° C. The gel product thus generated was ground with a grinder and further left at 40° C. for progress of saponification for 1 hour. To the saponified product obtained were added 50.0 parts by mass of dehydrated methanol and 7.7 parts by mass of ion-exchanged water, and heating was further continued at 65° C. for 1 hour.

Thereafter, a desired vinyl alcohol-based block copolymer (a binary block copolymer of vinyl alcohol-based polymer block (B-b)-copolymer block (B-c)) was obtained in the same manner as in Example 1. Details of the saponification step are shown in Table 2. The results of the measurement and evaluation of the vinyl alcohol-based block copolymer obtained are summarized in Table 3.

Comparative Example 1

Polymerization of vinyl acetate was initiated in the same manner as in Example 1. Sampling was appropriately performed, and the progress of the polymerization was checked from the solid concentration. When the conversion of vinyl acetate reached 13 mass %, 80.0 parts by mass of methyl acrylate was added. The number-average molecular weight (Mn) of the polymer at a conversion of 13 mass % was 85,800. Subsequently, sampling was appropriately performed, the progress of the polymerization was checked from the solid concentration, and when the total conversion of vinyl acetate and methyl acrylate reached 30 mass %, 0.84 parts by mass of 1,1-diphenylethylene was added as a polymerization inhibitor. The induction period was 7 hours and the growth period was 4 hours. After the addition of the polymerization inhibitor, the same operation as in Example 1 was performed to afford a vinyl ester-based block copolymer. Details of the above polymerization step are shown in Table 1.

Then, to a reactor same as above were added and dissolved 100 parts by mass of the vinyl ester-based block copolymer obtained and 358.1 parts by mass of dehydrated methanol, and then the water bath was heated and the solution was heated and stirred until the internal temperature reached 40° C. Thereto was added 41.9 parts by mass of a methanol solution of sodium hydroxide (concentration: 14 mass %, 5.9 parts by mass as sodium hydroxide). The thus-prepared vinyl ester-based block copolymer solution having a concentration of 20 mass % was subjected to a saponification reaction at 40° C. The gel product thus generated was ground with a grinder and further left at 40° C. for progress of saponification for 1 hour. To the saponified product obtained were added 50.0 parts by mass of dehydrated methanol and 7.7 parts by mass of ion-exchanged water, and heating was further continued at 65° C. for 1 hour.

Thereafter, a desired vinyl alcohol-based block copolymer (a binary block copolymer of vinyl alcohol-based polymer block (B-b)-copolymer block (B-c)) was obtained in the same manner as in Example 1. Details of the saponification step are shown in Table 2. The results of the measurement and evaluation of the vinyl alcohol-based block copolymer obtained are summarized in Table 3.

Comparative Example 2

A desired vinyl alcohol-based block copolymer was obtained in the same manner as in Comparative Example 1 except that dehydrated methanol and ion-exchanged water were not added to a saponified product obtained by progressing saponification at 40° C. for 1 hour. Details of the saponification step are shown in Table 2. The results of the measurement and evaluation of the vinyl alcohol-based block copolymer obtained are summarized in Table 3.

Comparative Example 3

In a reactor provided with a stirrer, a reflux condenser tube, an argon inlet tube, an initiator addition port, and a feed pump were charged 640 parts by mass of vinyl acetate, 1.1 parts by mass of methyl acrylate, and 250 parts by mass of methanol, and the inside of the reactor was flushed with an inert gas for 30 minutes while bubbling nitrogen. A water bath was heated to start warming of the reactor, and when the internal temperature reached 60° C., 0.15 part by mass of azobisisobutyronitrile (AIBN) was added as an initiator to initiate polymerization. Polymerization was performed while a 40 mass % methanol solution of methyl acrylate was fed with time. Sampling was appropriately performed, the progress of the polymerization was checked from the solid concentration, and when the total conversion of vinyl acetate and methyl acrylate reached 35 mass %, 0.10 parts by mass of p-benzoquinone was added to terminate the polymerization. The total amount of methyl acrylate fed at this time point was equivalent to 11.4 parts by mass. After the addition of the polymerization inhibitor, the same operation as in Example 1 was performed to afford a vinyl ester-based random copolymer. Details of the above polymerization step are shown in Table 1.

Then, to a reactor same as that of Example 1 were added and dissolved 100 parts by mass of the vinyl ester random copolymer obtained and 336.9 parts by mass of dehydrated methanol, and then the water bath was heated and the solution was heated and stirred until the internal temperature reached 40° C. Thereto was added 63.1 parts by mass of a methanol solution of sodium hydroxide (concentration: 14 mass %, 8.8 parts by mass as sodium hydroxide). The thus-prepared vinyl ester-based random copolymer solution having a concentration of 20 mass % was subjected to a saponification reaction at 40° C. The gel product thus generated was ground with a grinder and further left at 40° C. for progress of saponification for 1 hour. To the saponified product obtained were added 50.0 parts by mass of dehydrated methanol and 1.0 part by mass of ion-exchanged water, and heating was further continued at 65° C. for 1 hour. Thereafter, a desired vinyl alcohol-based random copolymer was obtained in the same manner as in Example 1. Details of the saponification step are shown in Table 2. The results of the measurement and evaluation of the vinyl alcohol-based random copolymer obtained are summarized in Table 3.

Comparative Example 4

To a reactor provided with a stirrer, a reflux condenser tube, and an initiator addition port were added 1.56 parts by mass of cobalt(II) tetramesitylporphyrin [Co(TMP)] and 0.91 parts by mass of azobisisobutyronitrile (AIBN) as an initiator. Inert gas purge was performed three times in which the inside of the reactor was vacuumed and then nitrogen was introduced. After that, 160.0 parts by mass of methyl acetate purified by simple distillation and 480 parts by mass of toluene were added, followed by immersion of the reactor in a water bath and heating to have an internal temperature of 60° C. and stirring. Sampling was appropriately performed, and the progress of the polymerization was checked from the solid concentration. When the conversion of methyl acrylate reached 18%, the polymerization was terminated by cooling to 30° C. The number-average molecular weight (Mn) of the polymer at a conversion of 18% was 15,500. The reactor was connected to a vacuum line, and residual methyl acrylate and toluene were distilled off at 30° C. under reduced pressure. After 640 parts by mass of vinyl acetate was added, the mixture was heated and stirred such that the internal temperature was 60° C. Sampling was appropriately performed, and the progress of the polymerization was checked from the solid concentration. When the conversion of vinyl acetate reached 22 mass %, 1.68 parts by mass of 1,1-diphenylethylene was added as a polymerization inhibitor. The induction period was 5 hours and the growth period was 4 hours. After the addition of the polymerization inhibitor, the same operation as in Example 1 was performed to afford a vinyl ester-based block copolymer. Details of the above polymerization step are shown in Table 1.

Then, to a reactor same as above were added and dissolved 100 parts by mass of the vinyl ester-based block copolymer obtained and 344.9 parts by mass of dehydrated methanol, and then the water bath was heated and the solution was heated and stirred until the internal temperature reached 40° C. Thereto was added 55.1 parts by mass of a methanol solution of sodium hydroxide (concentration: 14 mass %, 7.7 parts by mass as sodium hydroxide). The thus-prepared vinyl ester-based block copolymer solution having a concentration of 20 mass % was subjected to a saponification reaction at 40° C. The gel product thus generated was ground with a grinder and further left at 40° C. for progress of saponification for 1 hour. To the saponified product obtained were added 50.0 parts by mass of dehydrated methanol and 3.6 parts by mass of ion-exchanged water, and heating was further continued at 65° C. for 1 hour.

Thereafter, a desired vinyl alcohol-based block copolymer (a binary block copolymer of methyl acrylate polymer block-vinyl alcohol-based polymer block (B-b)) was obtained in the same manner as in Example 1. Details of the saponification step are shown in Table 2. The results of the measurement and evaluation of the vinyl alcohol-based block copolymer obtained are summarized in Table 3.

TABLE 1

|  | VAc | Acrylic Acid Ester | | | Solvent | | Initiator | |
| --- | --- | --- | --- | --- | --- | --- | --- | --- |
|  | Added Amount [parts by mass] | Type | Added Amount [parts by mass] | Conversion[3] [wt %] | Type | Added Amount [parts by mass] | Type | Added Amount [parts by mass] |
| Example 1 | 640 | MA | 1.2 | 19 | — | — | V70[1] | 0.86 |
| Example 2 | 640 | MA | 16.0 | 9 | — | — | V70 | 0.86 |

TABLE 1-continued

| | | | | | | | | |
|---|---|---|---|---|---|---|---|---|
| Example 3 | 640 | MA | 2.4/2.4 | 0/14 | — | — | V70 | 0.86 |
| Example 4 | 640 | MA | 6.4 | 15 | Methyl Acetate | 160 | V70 | 0.34 |
| Example 5 | 640 | MA | 1.6/1.6 | 20/24 | — | — | V70 | 3.44 |
| Example 6 | 640 | MA | 1.2 | 19 | — | — | V70 | 0.86 |
| Example 7 | 640 | MA | 49.0 | 19 | — | — | V70 | 0.86 |
| Comparative Example 1 | 640 | MA | 80.0 | 13 | — | — | V70 | 0.86 |
| Comparative Example 2 | 640 | MA | 80.0 | 13 | — | — | V70 | 0.86 |
| Comparative Example 3 | 640 | MA | 12.5 | 0-35 | Methanol | 250 | AIBN[2)] | 0.15 |
| Comparative Example 4 | 640 | MA | 160 | 0 | Toluene | 480 | AIBN | 0.91 |

| | Control Agent | | | Terminator | | |
|---|---|---|---|---|---|---|
| | Type | Added Amount [parts by mass] | Polymerization Temperature [°C.] | Type | Added Amount [parts by mass] | Conversion[4)] [wt %] |
| Example 1 | Co(acac)$_2$ | 0.24 | 30 | 1,1-DPEt | 0.84 | 22 |
| Example 2 | Co(acac)$_2$ | 0.24 | 30 | p-benzoquinone | 0.50 | 12 |
| Example 3 | Co(acac)$_2$ | 0.24 | 30 | 1,1-DPEt | 0.84 | 19 |
| Example 4 | Co(acac)$_2$ | 0.10 | 30 | 1,1-DPEt | 0.33 | 20 |
| Example 5 | Co(acac)$_2$ | 0.96 | 30 | 1,1-DPEt | 3.35 | 28 |
| Example 6 | Co(acac)$_2$ | 0.24 | 30 | 1,1-DPEt | 0.84 | 22 |
| Example 7 | Co(acac)$_2$ | 0.24 | 30 | 1,1-DPEt | 0.84 | 30 |
| Comparative Example 1 | Co(acac)$_2$ | 0.24 | 30 | 1,1-DPEt | 0.84 | 30 |
| Comparative Example 2 | Co(acac)$_2$ | 0.24 | 30 | 1,1-DPEt | 0.84 | 30 |
| Comparative Example 3 | — | — | 60 | p-benzoquinone | 0.10 | 35 |
| Comparative Example 4 | Co(TMP) | 1.56 | 60 | 1,1-DPEt | 1.68 | 22 |

[1)]2,2-azobis(4-methoxy-2,4-dimethylvaleronitrile)
[2)]Azobisisobutyronitrile
[3)]Total conversion at the addition of acrylic acid ester
[4)]Total conversion after terminating the polymerization

TABLE 2

| | Saponification Step | | | | | | | |
|---|---|---|---|---|---|---|---|---|
| | Vinyl Ester-Based Block Copolymer | | NaOH Added | | | Ion-Exchanged Water Total Added | | |
| | Added Amount [parts by mass] | Concentration [mass %] | Amount [parts by mass] | Reaction Temperature [°C.] | Reaction Time [h] | Amount [parts by mass] | Reaction Temperature [°C.] | Reaction Time [h] | Saponification Degree [mol %] |
| Example 1 | 100 | 20 | 9.2 | 40 | 1 | 0.2 | 65 | 1 | 99.8 |
| Example 2 | 100 | 20 | 1.6 | 40 | 1 | 3.1 | 40 | 1 | 98.5 |
| Example 3 | 100 | 20 | 8.8 | 40 | 1 | 1.0 | 65 | 1 | 99.8 |
| Example 4 | 100 | 20 | 0.4 | 40 | 1 | 1.0 | 40 | 1 | 88.0 |
| Example 5 | 100 | 20 | 9.1 | 40 | 1 | 0.4 | 65 | 1 | 99.8 |
| Example 6 | 100 | 20 | 9.2 | 40 | 1 | — | 65 | 1 | 99.8 |
| Example 7 | 100 | 20 | 9.2 | 40 | 1 | 7.7 | 65 | 1 | 99.8 |
| Comparative Example 1 | 100 | 20 | 5.9 | 40 | 1 | 7.7 | 65 | 1 | 99.8 |
| Comparative Example 2 | 100 | 20 | 5.9 | 40 | 1 | — | 65 | 1 | 99.8 |
| Comparative Example 3 | 100 | 20 | 8.8 | 40 | 1 | 1.0 | 65 | 1 | 99.8 |
| Comparative Example 4 | 100 | 20 | 7.7 | 40 | 1 | 3.6 | 65 | 1 | 99.8 |

TABLE 3

| | $Mn_a$ | $DP_a$ | $DP_b$ | $DP_b/DP_a$ | $Mw_a/Mn_a$ | Saponification Degree mol % | $(Z)^{1)}$ mol % | $(R)^{2)}$ mol % |
|---|---|---|---|---|---|---|---|---|
| Example 1 | 77,200 | 1,750 | 1,490 | 0.851 | 1.40 | 99.8 | 0.9 | 5.8 |
| Example 2 | 46,200 | 1,000 | 700 | 0.700 | 1.60 | 98.5 | 15.0 | 50.0 |
| Example 3 | 66,600 | 1,490 | 700 | 0.470 | 1.20 | 99.8 | 4.0 | 7.6 |
| Example 4 | 177,800 | 3,980 | 2,990 | 0.751 | 1.70 | 88.0 | 5.0 | 20.2 |
| Example 5 | 24,700 | 560 | 400 | 0.714 | 1.30 | 99.8 | 1.7 | 6.3 |
| Example 6 | 77,200 | 1,750 | 1,490 | 0.851 | 1.40 | 99.8 | 0.9 | 5.8 |
| Example 7 | 119,600 | 2,540 | 1,490 | 0.587 | 1.60 | 99.8 | 19.8 | 47.6 |
| Comparative Example 1 | 135,900 | 2,670 | 1,000 | 0.375 | 1.70 | 99.8 | 37.5 | 59.9 |
| Comparative Example 2 | 142,000 | 2,670 | 1,000 | 0.375 | 1.70 | 99.8 | 37.5 | 59.9 |
| Comparative Example 3 | 75,700 | 1,690 | 0 | 0 | 2.10 | 99.8 | 5.0 | 5.0 |
| Comparative Example 4 | 51,700 | 1,060 | 880 | 0.830 | 1.25 | 99.8 | 17.0 | 100.0 |

| | $(Q)^{3)}$ °C. | $2Z + Q$ | $(V)^{4)}$ | Solubility in Water | pH Stability | Percentage of Saturated Water Content mass % | Modulus of Elasticity kgf/mm$^2$ |
|---|---|---|---|---|---|---|---|
| Example 1 | 228.0 | 230 | 1.00 | A | A | 14.0 | 17.1 |
| Example 2 | 218.3 | 248 | 0.85 | A | A | 25.9 | 10.9 |
| Example 3 | 220.1 | 230 | 0.99 | A | A | 23.0 | 15.8 |
| Example 4 | 228.9 | 239 | 0.94 | A | A | 22.8 | 4.0 |
| Example 5 | 213.9 | 224 | 0.96 | A | A | 20.2 | 2.8 |
| Example 6 | 228.0 | 230 | 1.00 | A | A | 13.0 | 14.5 |
| Example 7 | 220.0 | 260 | 0.69 | A | A | 26.1 | 10.0 |
| Comparative Example 1 | 224.3 | 298 | 0.56 | A | B | 34.0 | 0.1 |
| Comparative Example 2 | 224.3 | 298 | 0.56 | B | — | — | — |
| Comparative Example 3 | 208.0 | 218 | 1.00 | A | A | 21.1 | 1.8 |
| Comparative Example 4 | 225.0 | 259 | 0 | A | B | 27.0 | 8.0 |

[1)]Content of acrylic acid-based monomer unit in vinyl alcohol-based block copolymer
[2)]Content of acrylic acid-based monomer unit in copolymer block (B-c)
[3)]Crystal melting temperature
[4)]Total of lactone ring/total of acrylic acid monomer unit and lactone ring The block copolymers of Examples 1 to 7 were satisfactory in all of the rate of dissolution in water (solubility in water), the aqueous solution viscosity stability with respect to pH (pH stability), and the mechanical property (modulus of elasticity).

Since the block copolymer of Example 4 had a relatively low saponification degree, the block copolymer had lower mechanical properties as compared with Example 1 although $Mn_a$ was relatively large. The block copolymer of Example 5 had relatively low $DP_b$, and therefore had lower mechanical properties as compared with Example 1. In Example 1, a treatment of adding dehydrated methanol and ion-exchanged water to the saponified product was performed, whereas in Example 6, this treatment was not performed, and thus the acrylic acid ester monomer unit remained without being converted into an acrylic acid unit or the like. As a result, the block copolymer of Example 6 had lower mechanical properties as compared with Example 1. Since the block copolymer of Example 7 had a relatively small (V) value, the pH stability of the aqueous solution was low as compared with Examples 1 to 6.

The block copolymer of Comparative Example 1 had a large value of content (Z), and was poor in pH stability and mechanical properties. The block copolymer of Comparative Example 2 had a large value of content (Z) and was not treated by adding dehydrated methanol and ion-exchanged water to the saponified product, and therefore the block copolymer contained a large number of acrylic acid ester monomer units and was poor in solubility in water. The copolymer of Comparative Example 3 was not a block copolymer but a random copolymer, had a large molecular weight distribution value, and was poor in mechanical properties. The block copolymer of Comparative Example 4 contained a methyl acrylate monomer block but did not contain a copolymer block (B-c), and was poor in pH stability.

The invention claimed is:

1. A vinyl alcohol-based block copolymer that is a block copolymer comprising a vinyl alcohol-based polymer block and a copolymer block, the copolymer block comprising a vinyl alcohol-based monomer unit and an acrylic acid-based monomer unit, wherein:
   a content of the acrylic acid-based monomer unit relative to all monomer units is 0.05 to 20.0 mol %,
   the block copolymer has a saponification degree of 80 to 99.99 mol %,
   the block copolymer has a number-average molecular weight ($Mn_a$) of 20,000 to 440,000,
   the block copolymer has a molecular weight distribution ($Mw_a/Mn_a$) of 1.05 to 1.95, and
   a ratio of the number-average polymerization degree of the vinyl alcohol-based polymer block to the number-average polymerization degree of the block copolymer is 0.010 to 0.999.

2. The block copolymer of claim 1, wherein the vinyl alcohol-based polymer block has a number-average polymerization degree of 450 to 5,000.

3. The block copolymer of claim 1, wherein a content of the acrylic acid-based monomer unit relative to all monomer units in the copolymer block is 0.1 to 50.0 mol %.

4. The block copolymer of claim 1, wherein a content (Z) [mol %] of the acrylic acid-based monomer unit and a crystal melting temperature (Q) [° C.] of a polymer obtained by re-saponifying the block copolymer to a saponification degree of 99 mol % or more satisfy formula (1) below:

$$2Z+Q \geq 225 \quad (1).$$

5. The block copolymer of claim 1, wherein a molar ratio of a lactone ring to a total of an acrylic acid monomer unit and a lactone ring [a lactone ring/a total of an acrylic acid monomer unit and a lactone ring] in a polymer obtained by heat-treating the block copolymer in an acidic aqueous solution and then drying the block copolymer is 0.70 or more.

6. A method for producing the block copolymer of claim 1, the method comprising:
polymerizing a vinyl ester and copolymerizing a vinyl ester and an acrylic acid ester by controlled radical polymerization in the presence of a radical initiator and an organic cobalt complex to obtain a vinyl ester-based block copolymer comprising a vinyl ester polymer block and a copolymer block, the copolymer block comprising a vinyl ester monomer unit and an acrylic acid ester monomer unit; and
saponifying the vinyl ester-based block copolymer obtained in the polymerization to obtain the block copolymer.

7. The method for producing the vinyl alcohol-based block copolymer of claim 6, wherein the acrylic acid ester is methyl acrylate.

8. The block copolymer of claim 1, wherein the block copolymer is water-soluble.

9. The block copolymer of claim 1, wherein the ratio of the number-average polymerization degree of the vinyl alcohol-based polymer block to the number-average polymerization degree of the block copolymer is from 0.3 to 0.8.

10. The block copolymer of claim 1, wherein the molecular weight distribution ($Mw_a/Mn_a$) is from 1.05 to 1.55.

11. The method of claim 6, wherein the vinyl ester is vinyl acetate.

12. The method of claim 6, wherein the vinyl ester is vinyl acetate and the acrylic acid ester is methyl acrylate.

13. The method of claim 6, wherein the vinyl ester is at least one selected from the group consisting of vinyl formate, vinyl acetate, vinyl trifluoroacetate, vinyl propionate, vinyl valerate, vinyl butyrate, vinyl isobutyrate, vinyl pivalate, vinyl caprate, vinyl laurate, vinyl stearate, vinyl benzoate, and vinyl versatate.

14. The method of claim 6, wherein the acrylic acid ester is at least one selected from the group consisting of methyl acrylate, ethyl acrylate, n-propyl acrylate, i-propyl acrylate, n-butyl acrylate, i-butyl acrylate, t-butyl acrylate, 2-ethylhexyl 5 acrylate, dodecyl acrylate, and octadecyl acrylate.

15. The method of claim 6, wherein the polymerizing of a vinyl ester occurs at a polymerization temperature in a range of from 0° C. to 80° C.

16. The method of claim 6, wherein the copolymerizing of a vinyl ester and an acrylic acid ester occurs at a polymerization temperature in a range of from 0° C. to 80° C.

17. The block copolymer of claim 1, wherein the saponification degree is from 90 mol % to 99.99 mol %.

18. The block copolymer of claim 1, wherein the number-average molecular weight ($Mn_a$) is at least 30,000.

19. The block copolymer of claim 1, wherein the number-average molecular weight ($Mn_a$) is at least 60,000.

20. The block copolymer of claim 1, wherein the number-average molecular weight ($Mn_a$) is at most 220,000.

* * * * *